June 14, 1938.  R. W. GLASNER  2,120,402
DRAWING PRESS
Filed Oct. 3, 1936  6 Sheets-Sheet 1

Fig.1

Inventor
Rudolph W. Glasner

June 14, 1938.  R. W. GLASNER  2,120,402
DRAWING PRESS
Filed Oct. 3, 1936  6 Sheets-Sheet 2

Inventor
Rudolph W. Glasner.
By
Atty

Patented June 14, 1938

2,120,402

UNITED STATES PATENT OFFICE 2,120,402

DRAWING PRESS

Rudolph W. Glasner, Chicago, Ill.

Application October 3, 1936, Serial No. 103,901

12 Claims. (Cl. 113—50)

This invention relates to presses and more particularly to that type of press used for drawing metal, and one of the principal objects of the invention is to provide an improved press of this character in which the work is formed or shaped between cooperating dies, and improved means for causing the work to be lifted by one of the dies upon ascent of the latter with the die carrying slide therefor, out of or away from the cooperating die to a predetermined position where it is then released from or ejected with respect to the die which has raised it.

A further object is to provide improved means, such as a conveyor for receiving the work when it has been released from the elevating die, and for conveying the work out of and away from the machine.

A further object is to provide improved means for positioning the conveyor with respect to the work so as to receive and convey away the work, and for also positioning the conveyor so that it will be out of the way so as not to interfere with the operation of the dies upon the work, the positioning of the material to be operated upon, or the raising of the completed article.

A further object is to provide improved automatically operable means for causing the conveyor to assume an active as well as an inactive position with respect to the work.

A further object is to provide in a press of this character an improved holder for a coil of material from which the articles are formed, and improved means for feeding the material from the coil into position in the press to be cut into the desired length and then operated upon.

A further object is to provide improved means whereby the material itself, as it is being uncoiled from the roll, will automatically control the feeding or supply of the material to the press.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which

Referring more particularly to the drawings, the press consists essentially of a bed 15 having uprights 16 rising therefrom that are connected at their upper ends by means of a crown 17. The crown 17 is preferably hollow and in it is arranged the operating mechanism for the slides. In the present exemplification of this invention two slides are shown, one of which, designated by the reference numeral 18, constitutes the outer slide movable in guideways 19 on the uprights 16, and this slide is connected by means of connecting members 20 to the actuating mechanism within the crown (not shown). The members 20 preferably pass through guides 21 and are adjustably connected by means of the threaded portions 22 to the slide.

Preferably four of these connecting means are provided for this slide, one arranged at each corner thereof.

Nested within the outer slide 18 is an inner slide 23 that is in turn connected by means of members 24 to the slide by a threaded connection, and adjusting means 25 cooperates with the threaded connection 24 to adjust the slide with respect to such connection. The other end of the connecting member 24 is in turn connected with the actuating mechanism for the inner slide and which actuating mechanism is located within the crown 17.

Connected to the outer slide 18 is a die member 26, and connected to the inner slide member 23 is a die member 27.

Both of the slides are adapted to reciprocate in timed relation with respect to each other.

Mounted upon the base or bed 15 is a die member 28 with which the outer die 26 cooperates, and arranged within the die 28 is an inner die 29 with which the die 27 on the inner slide 23 cooperates.

Obviously, the die members may be of any desired shape and configuration.

All of the above referred to parts are of the ordinary and well known construction.

Supported at any suitable elevation and preferably by the uprights 16, are bearing members 30 preferably one on each of the uprights 16, and these bearings are preferably located on the outside of the press frame to project respectively outwardly from the front and rear of the frame members 16.

Journaled in the respective pairs of bearing members 30 is a shaft 31, one arranged in advance of the front of the frame and the other to the rear of the rear face of the machine, and these shafts extend entirely across the frame and are parallel with each other.

Carried by each of the shafts 31 are pulleys 32, any number of which may be provided on each shaft, and endless flexible conveyor members or belts 33 constructed of any suitable flexible material may be provided to pass over the respective pairs of pulleys 32 on the front and rear shafts 31.

Mounted in each of the bearing members 30 and movable in suitable guides is a slide 34, and connected to each of these slides 34 and in any suitable manner, so as to move therewith and to be rotatable with respect thereto, is one of the pulleys 32, so that when the slide 34 is moved forwardly and backwardly, in a manner to be set forth, the respective pulley 32 will be simultaneously and laterally bodily moved to move the pulley into and out of an operative position with respect to the work and at predetermined times in the cycle of operation of the die carrying slides while the rotation of the pulleys will not be interfered with.

The movement of the slides 34 and the respective pulleys 32 is effected automatically at predetermined times in the cycle of operation of the die carrying slides so as to position the pulleys and the endless conveyors 33 to receive the work from one of the die carrying slides after the work has been shaped, to convey the work out of and away from the machine, and also to be moved into an inactive position so as not to interfere with the reciprocation or operation of the dies 26—27 and their respective slides 18—23.

This may be accomplished in any suitable manner, and a simple and efficient means for accomplishing this result comprises a rod or bar 35 which is connected rigidly by one end to a bracket 36 carried by the outer slide 18.

It is to be understood that at least four of these pulleys and slides 34 are employed, one adjacent each corner of the bed, and that one of these operating mechanisms for adjusting the respective pulleys 32 and endless conveyors 33 is also provided for each of the pulleys. Therefore, the description of one will apply equally to them all.

Pivotally mounted to a suitable bearing member or bracket 37 which is stationary with respect to the frame 16 and as at 38, is a bell crank lever provided with an arm 39 and an arm 40.

A link 41 is pivotally connected by one end as at 42 with the arm 39 and the other end of the link is pivotally connected as at 43 to the slide 34, so that when the bell crank lever is rocked about its pivot 38, the slide 34 will be moved forwardly and backwardly in its guides through the medium of the link 41.

A member 44 is provided with a trunnion or stud 45 which projects into and operates within a slot 46 in the arm 40 of the bell crank lever. The rod 35 passes loosely through the member 44, and a nut or collar 47 is adjustably secured to the end of the rod 35 below the member 44, so that when the nut or collar 47 contacts the member 44 on the upward movement of the rod 35 with the slide 18, the arm 40 will be rocked with the arm 39 about the pivot 38 and through the medium of the link 41 the slide 34 will be moved inwardly so as to position the roller 32 as well as the endless conveyor 33 in a position beneath the dies.

When the slide 18 starts to descend the rod or bar 35 will move through the member 44, and the nut or collar 47 will be lowered with respect to the member 44, thereby permitting the slide 34 and pulley 32, together with the endless conveyor 33 to be moved into an inactive position, by moving the pulley 32 and endless member 33 out of the path of the downward movement of the dies on the die slides, so as not to interfere with the operation of the press. This return movement of the slide 34 and the pulley 32, together with the endless conveyor 33 may be accomplished in any suitable manner, such as by means of a spring 48 that is anchored by one end as at 49 to the frame 18 and is connected by its other end to the arm 39 of the bell crank lever.

Thus it will be seen that when the die slides are elevated, the endless conveyor and the pulleys 32 will be positioned so as to receive the work which is to be ejected from one of the dies after the work has been elevated by such die, and when the die slides start to return or move in a direction to cause the dies to approach the bed of the press, the pulleys 32 and endless conveyor 33 together with the slide 34 will be moved into an inactive position and out of the path of the return movement of the dies.

Obviously this advancing and retracting of the slides 34 may be accomplished in any other suitable manner.

The conveyor comprises the endless members 33 arranged at opposite sides of the press which latter receive their motion from one of the shafts 31, the latter being driven by a suitable motor 50 supported by a suitable bracket 51 connected to one of the uprights 16. A suitable connection or clutch device 52 may be arranged between the motor drive and the shaft 31. The other shaft 31 receives its motion from the driven shaft through the medium of the endless conveyors 33 passing over the pulleys.

The pulleys 32 are laterally movable and bodily slidable upon the shafts 31, but are connected to the respective shafts 31 for rotation therewith. This result may be accomplished by means of a key or lug connected with the pulley and movable lengthwise of the shaft 31, in a groove or slot 53 in the shaft.

Thus it will be manifest that the pulleys on each end of the press may be moved towards or away from each other upon the respective supporting shafts 31, and at the same time will be adapted for rotation with the shafts.

Figure 1:
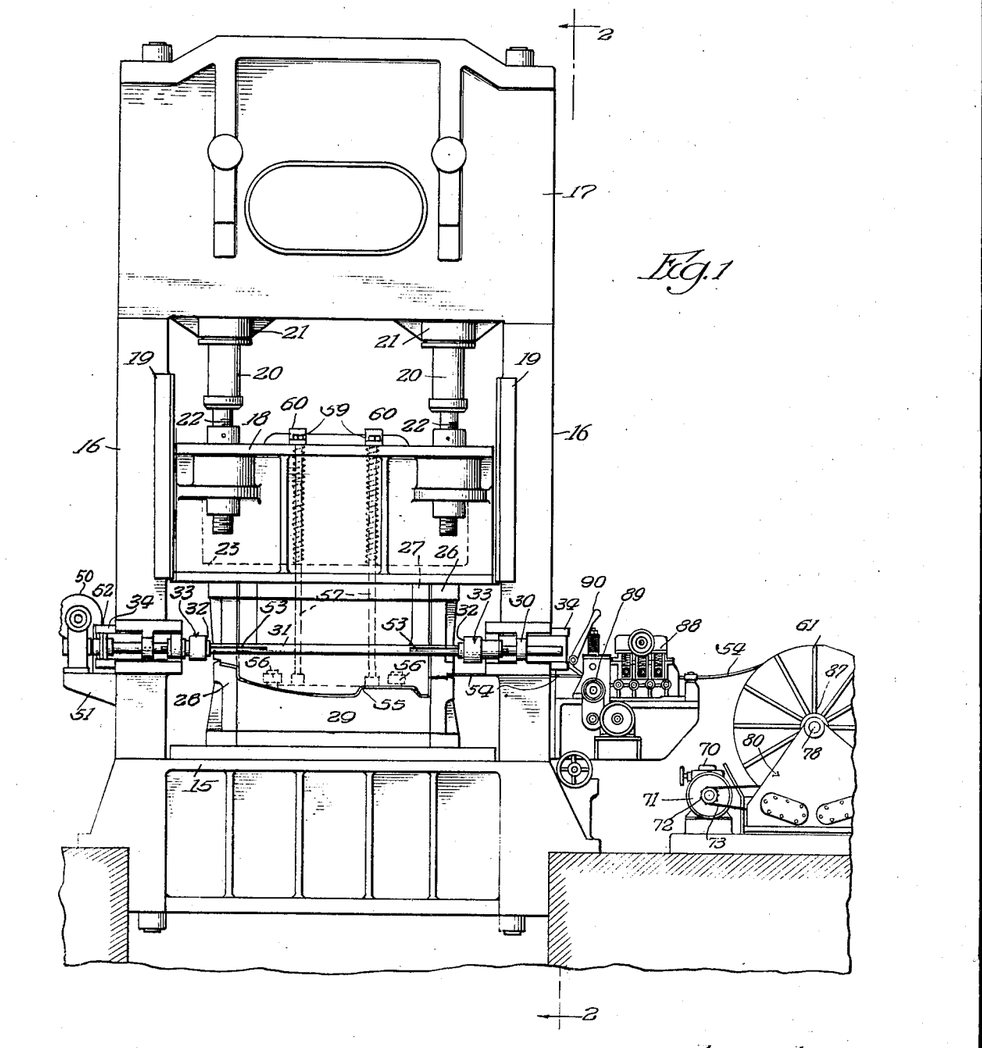
Figure 1 is a front elevation of a press of this character constructed in accordance with the principles of this invention, with parts omitted and showing the general arrangement or position of the receiver or conveyor.
Figures 2, 3:
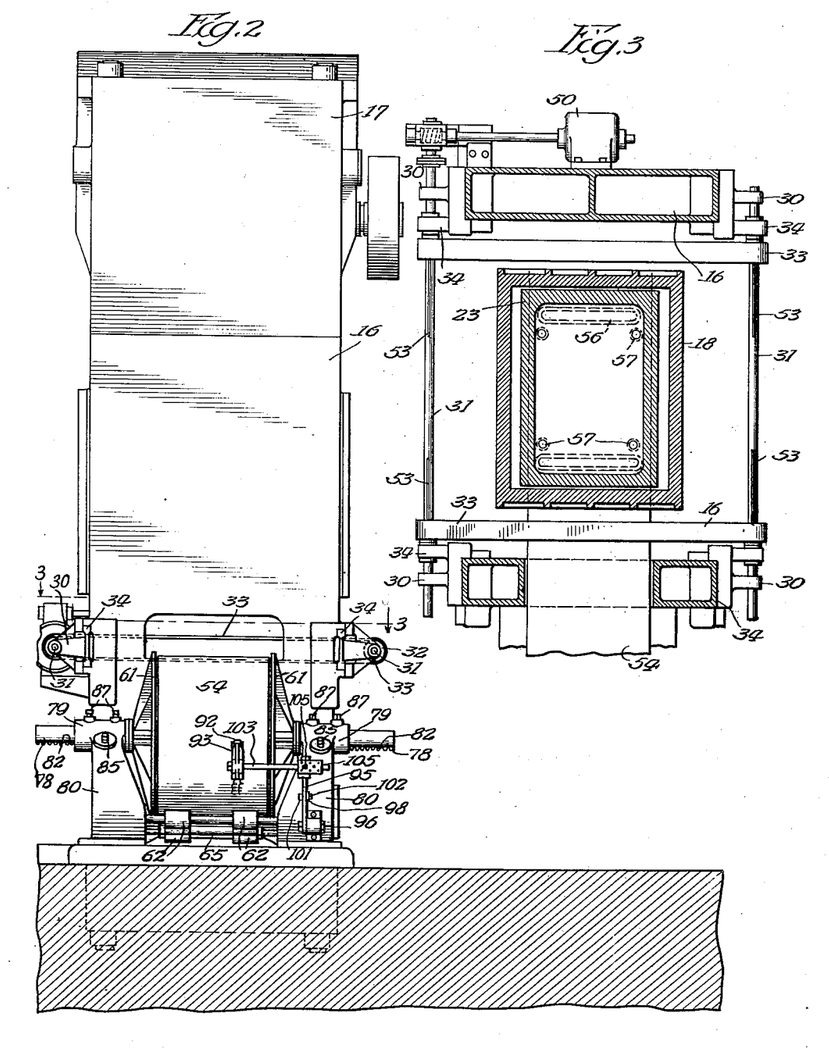
Figure 2 is an end elevation taken on line 2—2, Figure 1, on a reduced scale.
Figure 3 is a detail, horizontal, sectional view taken on line 3—3, Figure 2, on an enlarged scale.
Figure 4:
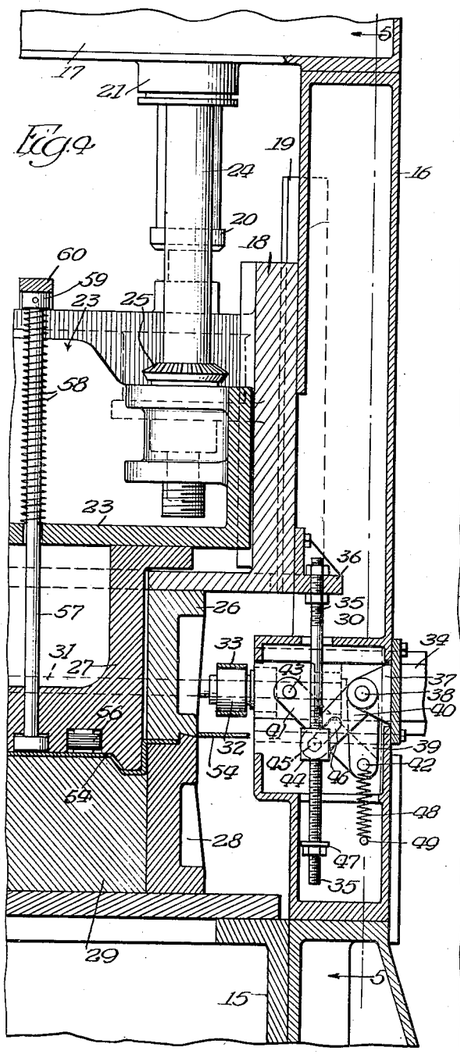
Figure 4 is a fragmentary view, partly in elevation, partly in section, and partly broken away, with parts omitted and showing a portion of the positioning means for the receiver or conveyor.
Figure 5:
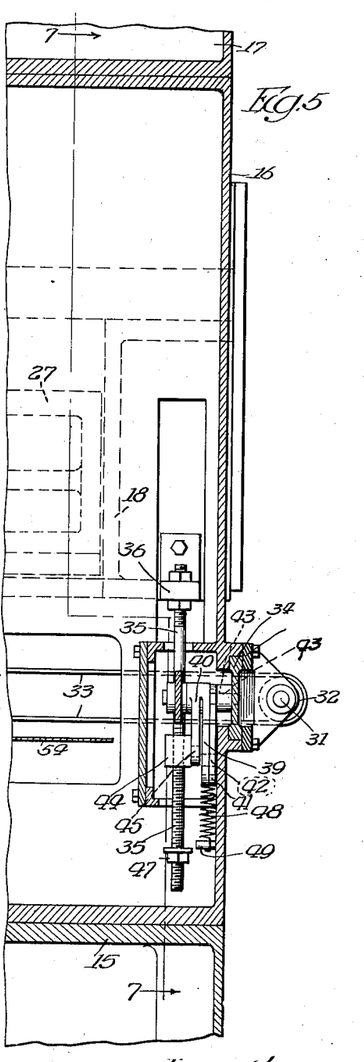
Figure 5 is a detail sectional view taken on line 5—5, Figure 4.
Figures 6, 7:
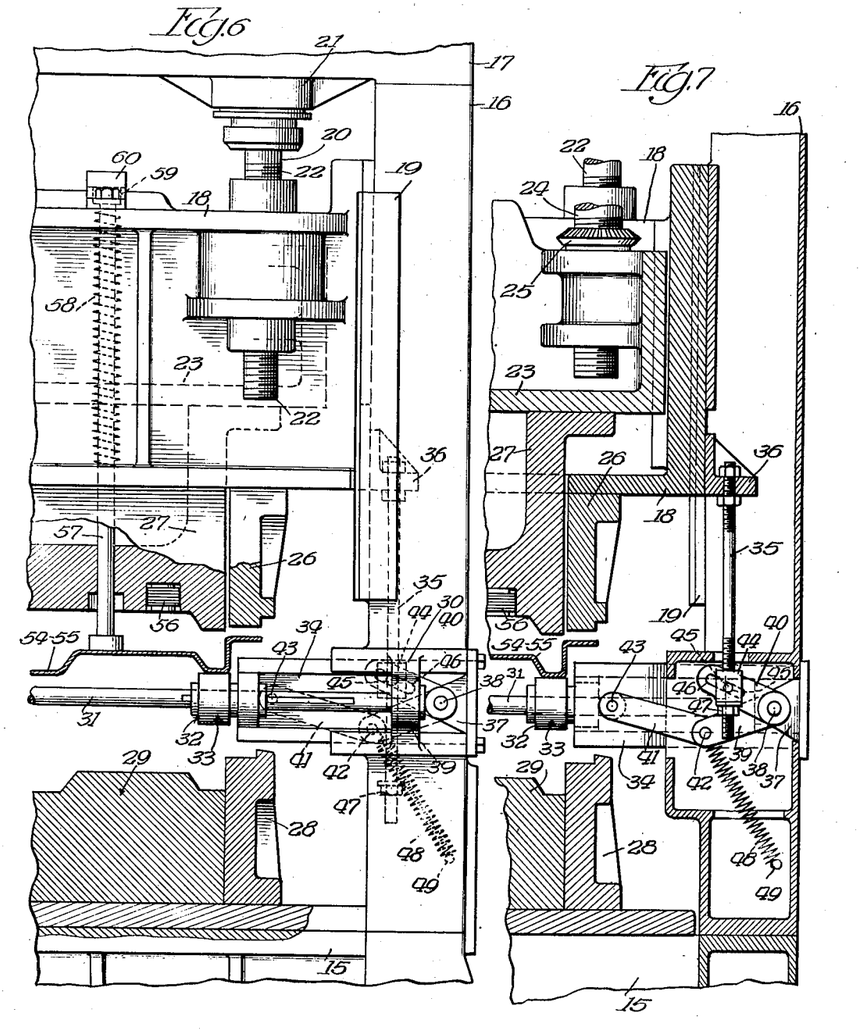
Figure 6 is a view similar to Figure 4, showing the parts in elevation and in a different position.
Figure 7 is a detail sectional view on an enlarged scale, as taken on line 7—7, Figure 5.
Figure 8:
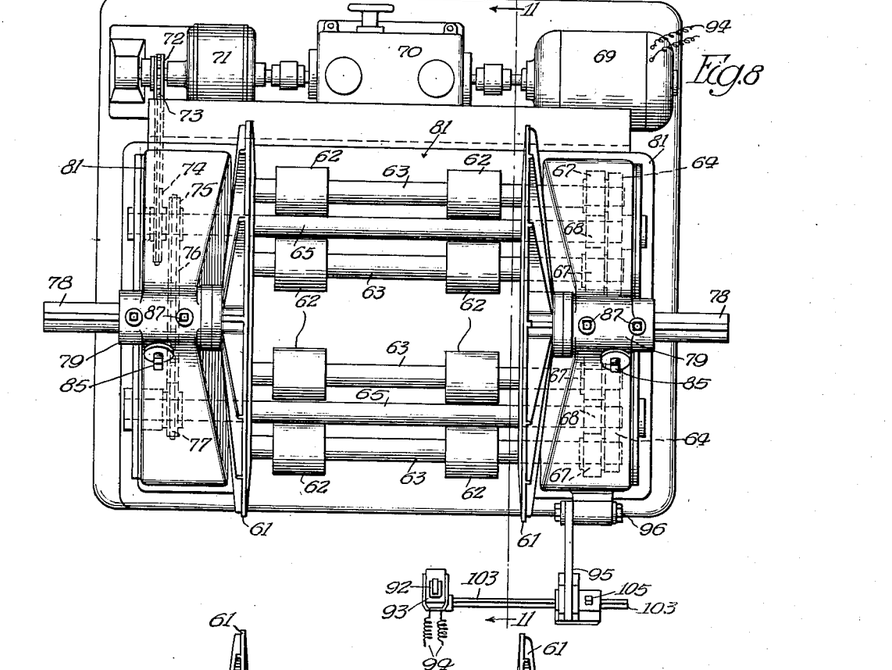
Figure 8 is a top plan view of the holding mechanism for the coil of material and the control therefor.
Figure 9:
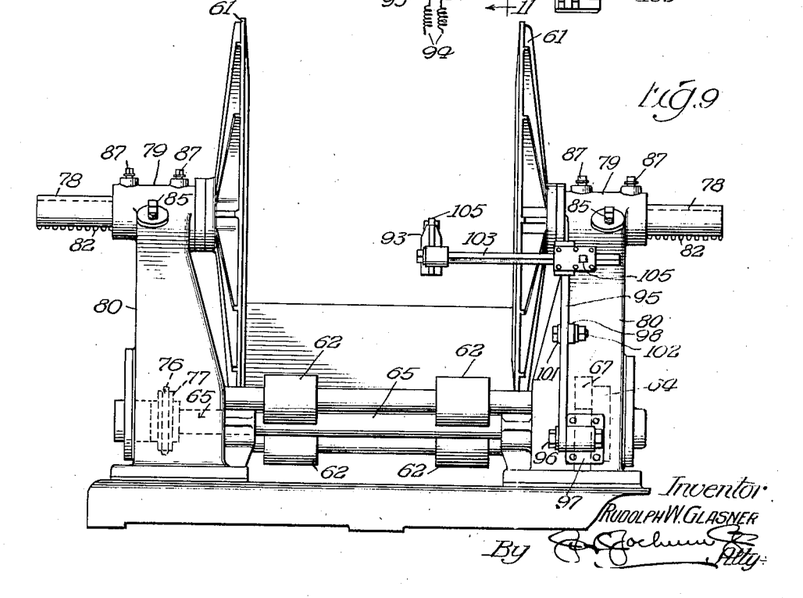
Figure 9 is an elevation taken from the left hand side of Figure 10.

The work 54 is fed into the machine in a manner to be set forth, and is positioned with respect to the lower dies 28 and 29, after which the upper dies 26—27 descend to first sever the material, and the severed portion is shaped between the dies as shown at 55 in Figure 1. During the shaping of the work in this manner, the pulleys 32 and the endless conveyors 33 are in such position as not to interfere with the reciprocation of the dies.

After the work has been shaped and when the slides ascend, the work 55 is elevated or raised with respect to the lower die or dies and ascends with the upper dies so as to assume a position to be delivered upon the endless conveyors.

This raising of the work may be effected in any suitable manner, but preferably by means of a magnet 56 carried by the inner die 27, the latter magnetically holding the work in position with respect to the inner die 27 as the latter is ascending.

Any suitable means may be provided for ejecting or disconnecting the work 55 from the die 27 and from the magnet 56. This may be accomplished by means of suitable ejector rods or members 57, any number of which may be provided and which are preferably carried by the inner die slide 23, so that the lower ends thereof may be projected through and beyond the face of the inner die 27. A spring 58 normally holds the end of the ejector rod 57 retracted, and a nut or collar 59 prevents the rods from dropping out of position.

Normally, the end of the ejector rod will be held retracted by the spring 58.

During the raising of the slides, the outer slide, at one point during the cycle of operation will be raised in advance of the inner slide, and this occurs just before the slides reach the limit of their upward movement, and carried by the outer slide is an abutment or stop 60, which is positioned to be engaged by the upper end of the ejector member 57 when the inner slide 23 approaches the limit of its upward movement, and as the end of the rod 57 contacts the abutment 60, the lower end of the rod 57 will be projected beyond the face of the inner die 27 to contact the work 55 and thereby eject or strip the same from the die 27 and the magnet 56. Just before this operation occurs and during the upward movement of the outer slide, and at the proper time in the cycle of operation of the outer slide, the pulleys 32 and endless conveyors 33 will be moved under the work and into a position to receive the work 55 as it is stripped and dropped from the inner die 27. The work will, upon falling upon the conveyor, be conveyed out of and away from the machine.

Obviously, any desired number of ejector members 57 as well as magnet members 56, suitable for the purpose, may be employed.

It will therefore be manifest that after the work is fed into the machine and cut to the proper length it will be shaped. After the shaping and as the dies ascend, the shaped work will be carried upwardly with the dies. At the proper time in the operation of the press and as the outer slide ascends, the conveyor members will be positioned beneath the work so that when the work is stripped from the die and magnet, it will drop upon the conveyor.

As soon as the die slides start to descend, the pulleys and the endless conveyors will be shifted or moved into an inactive position, or out of the way of the return movement of the dies, so as not to interfere with the operation of the dies or slides.

When the article is released from the die and is deposited upon the conveyors, it will be moved out of the machine by the conveyors.

The material 54 to be operated upon is preferably supplied in a coil, and the coil is arranged between two holders or heads 61 that are disposed in close proximity to the edges of the work, and the coil is supported by means of rollers 62 arranged in pairs and mounted upon shafts 63 for rotation therewith.

In the present exemplification of this invention, four of these shafts are shown and two rollers are mounted upon each shaft, but it is to be understood that any desired number of shafts and rollers may be provided.

Two of these shafts are arranged parallel and spaced laterally from each other for any suitable distance, and the ends of the respective pairs of shafts are journaled in supporting members 64, the latter in turn being journaled upon a shaft 65 that is itself journaled in suitable bearings and extends across the space between the heads 61. These members 64 together with their associated shafts and rollers cooperate to provide a cradle in which the reel 66 carrying the material 54 is adapted to be supported by resting thereupon.

Obviously, the members 64 with their associated shafts and rollers will be automatically adjusted or positioned by the deposit of the reel thereupon and this cradle takes care of the variation in the diameter of the coiled stock and also takes care of oval coils, that is in case the reel or coil is not perfectly round.

One of the members 64 may be provided at each end of the pairs of shafts 63, and mounted upon each of these shafts 63 at one end thereof and for rotation therewith is a gear 67, and mounted upon the shaft 65 intermediate the gears 67 and meshing with these gears is another gear 68 by means of which motion will be imparted to the respective rollers 62 through the medium of the intermediate gears.

Each pair of shafts 63 is similarly connected, and motion is imparted to the shaft 63 by means of a motor 69, hydraulic variable speed transmission diagrammatically illustrated at 70, and a speed reducer diagrammatically illustrated at 71, to the shaft of which speed reducer 71 is connected a sprocket wheel 72 over which a sprocket chain 73 passes. This sprocket chain 73 passes over a sprocket wheel 74 on one of the shafts 65. On this latter shaft is mounted another sprocket gear 75 over which a sprocket chain 76 passes, and the sprocket chain in turn passes over a sprocket gear 77 secured to the other shaft 65.

Thus it will be seen when the member 69 is operated, the rollers 62 will also be operated and the work coil 66 will be rotated, the coil being held against edgewise movement, and in proper position with respect to the supporting rollers 62 by means of the holders or heads 61.

Figures 10, 12:
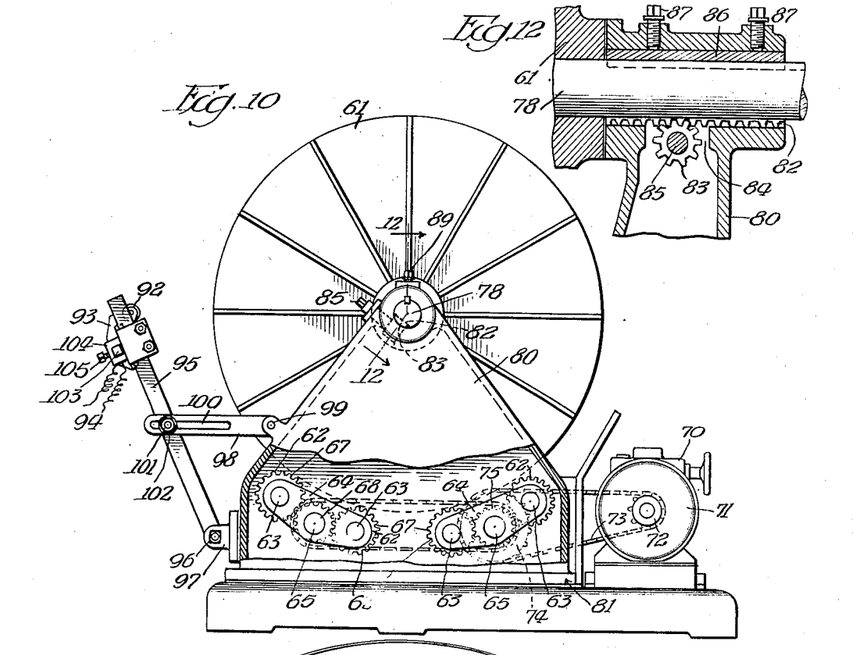
Figure 10 is a side elevation taken from the right hand side of Figure 8, with parts broken away.
Figure 12 is a detail sectional view taken on line 12—12, Figure 10.

The heads 61 are each provided with a centrally disposed and laterally projecting shaft 78 that is longitudinally slidable in a bearing 79 mounted upon a support 80 superposed upon a base 81 and on each of the shafts 78 is provided a rack 82 (see particularly Figure 12) with which a gear 83 meshes, the gear 83 projecting through an aperture 84 in the bearing. The end of a shaft 85 on which the gear 83 is mounted, preferably projecting beyond the bearing and being angular in cross section for the reception of a crank or handle by means of which the gear 83 may be rotated and the heads 61 correspondingly adjusted.

A clamp member 86 may be provided to lock the head in its adjusted position, and binding screws 87 operate upon the clamping member.

Thus it will be seen that when a coil is properly positioned and the motor 69 operated, the supporting rollers 62 will be rotated and the work or material 54 will be fed from the coil and will pass through a suitable straightening mechanism 88 of any suitable construction, and between ordinary feed rollers 89, which latter are arranged in a position to deliver the material into the machine to be operated upon.

The numeral 90 designates a lever by means of the use of which the feed rollers may be separated to prevent the feeding of the material, when desired. The straightening and feeding mechanism is of ordinary and well known construction.

The uncoiling mechanism is provided to uncoil the sheet material from the spool or reel and furnish it to the press roll feed without any pull being required by the roll feed, and this is accomplished by rotating the rollers 62, the speed of uncoiling being preferably the same as the peripheral roll speed, and this speed may be variable over a wide range. The variable uncoiling speed provides a wide operation of the speed movement of the work through the press, and the mechanism is adapted for adjustment to compensate varying widths of material.

Figure 11:
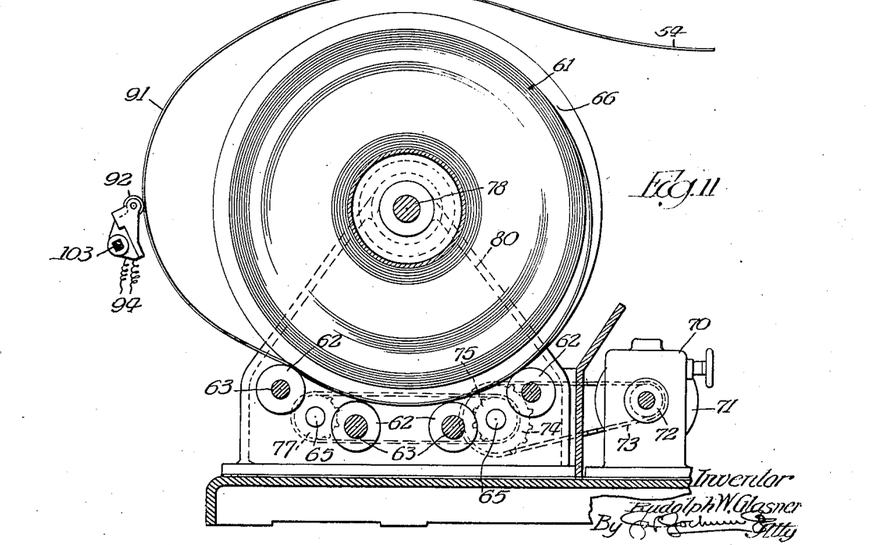
Figure 11 is a sectional view taken on line 11—11, Figure 8.

It sometimes happens that the uncoiling of the material 54 from the coil is too rapid, and in that event the material after it leaves the coil forms itself into a loop 91 (see particularly Figure 11) and if the feed is too rapid, a larger loop is formed, and this loop portion of the material contacts an arm or member 92 preferably in the form of a roller of a limit switch designated generally by the reference numeral 93, to stop the operation of the motor 69, and consequently the feeding of the material.

This limit switch 93 may be of any desired and well known construction, suffice it to say that it is provided with an arm or member 92 that is pivotally mounted and is contacted by the loop of the material to be shifted thereby and to operate any ordinary and well known switch, or the member 92 itself may be the controlling member of the switch, if desired. The limit switch is connected by means of suitable conductors 94 with the motor 69 so that when the limit switch is actuated or shifted by the coil of material, the motor will be stopped.

As soon as the excess material has been taken up and the size of the loop 91 reduced, the switch will move in the opposite direction and thereby complete the circuit through the motor to start the latter to operate.

The limit switch 93 is preferably mounted upon an arm or member 95, which in turn is pivotally mounted as at 96 upon a bracket 97 supported by any stationary part of the mechanism, so that the member 95 may be moved about the pivot 96 to move the limit switch toward and away from the axis of rotation of the coil 66 and thereby render it possible to vary the operation of the machine by the amount of loose material or the loop 91 of the material as it is paid out from the reel.

In order to hold the arm or member 95 in its adjusted position, there may be provided a link or member 98 pivotally mounted as at 99 on any suitable stationary part of the mechanism. The member 98 is provided with a slot 100 to receive a bolt 101 that is connected with the arm or member 95. A fastening nut 102 is provided upon the bolt 101. By loosening the nut 102, it will be manifest that the arm or member 95 may be swung about its pivot 96 and when in the desired position, the nut 102 may be tightened.

The limit switch 93 is preferably supported upon a bar or rod 103 that is preferably angular in cross section and passes through a suitable bearing or bracket 104 carried by the member 95. A fastening screw 105 being provided to secure the limit switch in any desired position. That is, by loosening the screw 105 the limit switch may be adjusted laterally with respect to the arm or member 95 and then secured in position by tightening the screw 105.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a press, a frame, a press bed, a die slide movable in the frame, means for operating the slide, an endless traveling receiver for receiving the work after it has been shaped, magnetic means for raising the work with the slide, means operating automatically to bodily position the receiver beneath the slide to receive the work after it is raised by the slide and while still in this position operating to remove the work from the press, means for stripping the work from the slide, and means for operating the receiver.

2. In a press a frame, a bed, a reciprocable die carrying slide, means for reciprocating the slide, a pair of endless travelling conveyors in the frame on opposite sides of the die, means for raising the work with the die to a point above the conveyors, means operating automatically at a predetermined time in the cycle of movement of the slide to bodily move the conveyors into position under the work when the latter is raised and to bodily move the conveyors out of such position, means for causing the work to be delivered from its raised position on to the conveyors and while the conveyors are still in a position beneath the slide to remove the work from the press, and means for operating the conveyors.

3. In a press a frame, a bed, a reciprocable die carrying slide, means for reciprocating the slide, a pair of endless traveling conveyors in the frame on opposite sides of the die, means for raising the work with the die to a point above the conveyors, means controlled in its operation by the movement of the slide to bodily move the conveyors into position under the work when the latter is raised and while in this position to remove the work from the press, the last said means also operating to bodily move the conveyors out of such position, means for causing the work to be delivered from its raised position on to the conveyors, and means for operating the conveyors.

4. In a press a frame, a bed, a reciprocable die carrying slide, means for actuating the slide to shape the work, a pair of endless travelling conveyors in the frame at opposite sides of the slide, means for raising the work with said slide, means for bodily moving the conveyors into position under the work and while in this position operating to remove the work from the press, the said means also operating to bodily move the conveyor out of such position, means for causing the work to be delivered from its raised position on to the conveyors, and means for actuating the conveyors.

5. In a press, a frame, a bed, a reciprocable die carrying slide, means for actuating the slide to shape the work, a pair of endless travelling conveyors in the frame at opposite sides of the slide, means for raising the work with said slide, means controlled in its operation by the movement of the slide for bodily moving the conveyors into position under the work and while in this position operating to remove the work from the press, the last said means also operating to bodily move the conveyors out of such position, means for causing the work to be delivered from its raised position on to the conveyors, and means for actuating the conveyors.

6. In a press, a frame, a bed, a reciprocable die carrying slide, means for actuating the slide to shape the work, a pair of endless travelling conveyors in the frame at opposite sides of the slide, means for raising the work with said slide, means embodying lever and link mechanism for bodily moving the conveyors into position under the raised work and while in this position to remove the work from the press, the last said means also operating to bodily move the conveyors out of such position, means whereby the movement of the slide will actuate said mechanism, means for causing the work to be delivered to the conveyors, and means for actuating the conveyors.

7. In a press, a frame, a press bed, a die slide movable in the frame, means for operating the slide, means for supporting a coil of material adjacent the press, means for feeding the material into the press to be operated upon by said die, an endless carrier for receiving and conveying away the work shaped by the die, means operating to cause the work to be raised with the die, means operating automatically at a predetermined time in the cycle of operation of the slide to bodily move the said carrier into a position beneath the raised work and while still in this position operating to convey away the work from the press, means for causing the work to be delivered to the carrier, and means other than the said bodily moving means for actuating said carrier.

8. In a press, a frame, a press bed, a die slide movable in the frame, means for operating the slide, means for supporting a coil of material adjacent the press, means for feeding the material into the press to be operated upon by said die, an endless conveyor for receiving and conveying away the work shaped by the die, means operating to cause the work to be raised with the die, means operating automatically at a predetermined time in the cycle of operation of the slide to bodily move the conveyor into a position beneath the raised work and while still in this position operating to convey the work from the press, means for causing the work to be delivered on to the carrier, means other than the carrier positioning means for actuating the carrier, and means controlled by the material as it is being unwound from the coil for controlling the feeding of the material to the press.

9. In a press, a frame, a press bed, a die slide movable in the frame, means for operating the slide, means for supporting a coil of material adjacent the press, means for feeding the material into the press to be operated upon by said die, an endless carrier for receiving and conveying away the work shaped by the die, means operating to cause the work to be raised with the die, means operating automatically at a predetermined time in the cycle of operation of the slide to bodily move the carrier into a position beneath the raised work, and while still in this position operating to convey the work from the press, means for causing the work to be delivered on to the carrier, means other than the carrier positioning means for actuating the carrier, and means controlled by the material as it is unwound from the coil for controlling the feeding of the material to the press, the last recited means embodying a cut-out device adapted to be engaged and shifted by the slack in the material of the coil for controlling an electric motor which operates the feeding means.

10. In a press, a pair of dies one of which is movable toward and away from the other, means for causing the work to move with the movable die, article delivery means for receiving the article after it has been shaped, said delivery means embodying supports and members mounted for movement with and with respect to such supports, said delivery means being normally disposed in an inactive position to the side of and out of the plane of operation of the dies, means for bodily moving said supports to position some of said members in an active position between the dies and beneath the work when the dies are separated, and means for actuating said members with respect to said supports, those of said members which are between the dies, and while in such position, receiving and operating to deliver the article out of the press.

11. In a press, a pair of dies one of which is movable toward and away from the other, means for causing the work to move with the movable die, article delivery means for receiving the article after it has been shaped, said delivery means embodying supports and members mounted for movement with and with respect to the supports, said delivery means being normally disposed in an inactive position to the side of and out of the plane of operation of the dies, means for bodily moving said supports to position some of said members between the dies and beneath the work when the dies are separated, and means for actuating said members with respect to said supports, those of said members which are between the dies and while in such position, receiving and operating to deliver the article from between the dies and out of the press, said supports being responsive in their movements to cause the said members to be moved into and out of position between the dies, to the actuation of the said movable die.

12. In a press, a frame, a press bed, a die slide movable in the frame, means for operating the slide, a carrier for receiving the work after it has been shaped, supports for the carrier, said carrier movable with and with respect to the supports means for causing the work to be raised with the slide, means operating to move said supports and carrier to position the latter beneath the slide to receive the work after it has been raised by the slide, and means to operate the carrier with respect to said supports when the carrier is still in the last said position to convey the work from the press.

RUDOLPH W. GLASNER.